(12) United States Patent  
Palm

(10) Patent No.: US 6,234,069 B1  
(45) Date of Patent: May 22, 2001

(54) APPARATUS IN AN INFUSOR FOR A LIQUID FOOD PRODUCT

(75) Inventor: Bengt Palm, Genarp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/601,623

(22) PCT Filed: Feb. 5, 1999

(86) PCT No.: PCT/SE99/00160

§ 371 Date: Oct. 10, 2000

§ 102(e) Date: Oct. 10, 2000

(87) PCT Pub. No.: WO99/39592

PCT Pub. Date: Aug. 12, 1999

(30) Foreign Application Priority Data

Feb. 6, 1998 (SE) .................................... 9800351

(51) Int. Cl.⁷ ................ A23L 1/00; A23L 3/00; A23C 3/02; H05K 3/34
(52) U.S. Cl. ................ 99/453; 99/452; 99/483; 99/516
(58) Field of Search ............... 99/452–455, 467, 99/470, 471, 473–476, 483, 516, 534; 426/520–522, 392, 394, 399, 406, 407; 422/26, 307; 239/419, 422–424, 432, 518

(56) References Cited

U.S. PATENT DOCUMENTS 3,555,991 * 1/1971 Strakhov et al. .................. 99/455
3,973,048    8/1976 Sollerud .
4,310,476 * 1/1982 Nahra et al. .................. 99/453 X
4,375,185 * 3/1983 Mencacci .................. 99/483 X
4,390,350 * 6/1983 Palm .................. 99/453 X
4,432,276 * 2/1984 Catelli .................. 99/453 X
4,787,304   11/1988 Bronnert .
5,494,691    2/1996 Sizer .

FOREIGN PATENT DOCUMENTS 610223      3/1989 (AU) .
0 800 755  12/1995 (EP) .

* cited by examiner

Primary Examiner—Timothy F. Simone  
(74) Attorney, Agent, or Firm—Burns, Doane, Swecker & Mathis, L.L.P.

(57) ABSTRACT

The invention relates to an apparatus in an infusor (1). The infusor (1) is of the type which includes an autoclave (2) with an inlet (3) located in its upper region for the product which is to be heat-treated, and an outlet (7) for the ready-treated product located in its lower region. The inlet (3) is provided with a distributor chamber (4) which divides the product into small droplets (20) when the product enters into the autoclave (2). The infusor (1) further includes an inlet (8) for steam which is placed in the lower region of the autoclave (2). The steam inlet (8) consists substantially of a concentric aperture (14) in the casing surface (10) of the autoclave (2).

6 Claims, 3 Drawing Sheets

APPARATUS IN AN INFUSOR FOR A LIQUID FOOD PRODUCT

TECHNICAL FIELD

The present invention relates to an apparatus in an infusor for a liquid food product, the apparatus being of the type which includes an autoclave with an inlet for the product located in its upper region and an outlet for the product located in its lower region, the inlet being arranged to divide the product entering the autoclave into small droplets, the infusor further including an inlet for steam located in the lower region of the autoclave.

BACKGROUND ART

Heat-treating food products for increased shelf life is a well-known and often-employed method. For example, the food product may be various dairy produce such as milk, cream or yoghurt. The heat treatment may take place in a plurality of ways, either directly or indirectly. Indirect methods are, for instance, heating by means of different types of heat exchangers. Of the direct methods, there are two major groups, injection of infusion with steam. By employing a direct method, an extremely rapid heating will be obtained which today is to be sought after since, in order to improve the flavour properties of, for example, milk, it is often the intention to heat to elevated temperatures for brief periods of time.

The present invention relates to an apparatus which employs infusion heating. Infusion entails that a finely-divided liquid is heated in a steam chamber. The principle of heating a liquid, for example a liquid food, by injecting the food into a chamber filled with steam has been known since the early part of the nineteenth century.

The first infusion heating plants were based on the same principle as condensers, by means of which excess steam from various chemical processes was condensed. The earlier plants thus displayed an infusor which consisted of an autoclave with an inlet for the product in the upper region of the autoclave. The inlet discharged in a distributor chamber which divided the incoming product into small, fine liquid droplets. At the bottom of the autoclave, there is an outlet for the heated product, The autoclave was further provided with an inlet for steam which, in these early infusors, was located in the lower region of the autoclave. A drawback inherent in these infusors for, for example, milk is however that the steam which is injected at a low level into the autoclave towards the finely-divided liquid droplets causes the droplets to change direction and many of the droplets became stuck to the hot inside walls of the infusor where burning of the product was the immediate outcome. Burning of the product onto such hot walls entails major hygienic problems and such burnt product is extremely difficult to wash off.

One method of obviating the problem with burning of the product onto the inner walls of the infusor is to place the steam inlet in the upper region of the infusor. The steam is fed from above over the distributor chamber of the product so that the droplets are not disrupted in their fall down through the steam chamber. But the admission of steam concurrently with the admission of product also has its drawbacks. This type of steam admission may give rise to burning of product around or in the distributor apertures of distributor gaps displayed by the distributor. This disrupts the heating of the product, the temperature of the product falls, and so the steam pressure must be increased and higher temperature differences will occur between product and steam. By designing the distributor apertures such that they will have a very thin edge out towards the steam chamber, this problem may be solved in that very thin layers of product will be burnt fast which are easily broken off before becoming disruptive.

However, the concurrent admission of steam also entails problems with the uncondensable gases which are always to be found in the product and which are emitted in connection with its heating. The steam also contains a quantity of these gases. The gases may consist of oxygen, nitrogen, carbon dioxide and others. These gases must be continuously removed in order for it to be possible to maintain the steam temperature at the same pressure. As a result of a concurrent steam admission, the uncondensable gases more readily mix with the steam and it becomes difficult to remove them without also unnecessarily releasing steam out from the process.

It would, thus, entail major advantages if it were possible to employ the "classic" solution with a steam inlet placed well down on the infusor without suffering from the problems involved in burning of product from which this solution previously suffered.

OBJECTS OF THE INVENTION

One object of the present invention is to be able to place the steam inlet on an infusor in the lower region of the autoclave, without the steam, on being admitted, disrupting the falling droplets and causing them to spatter against the hot inner walls in the infusor, and cause burning of product which is difficult to wash off.

A further object of the present invention is, as a result of the low placing of the steam inlet, to make it easier to collect and evacuate uncondensable gases.

SOLUTION

These and other objects have been attained according to the present invention in that the apparatus of the type described by way of introduction has been given the characterizing feature that the steam inlet substantially consists of a concentric aperture in the casing surface of the autoclave.

Preferred embodiments of the present invention have further been given the characterizing features as set forth in the appended subclaims.

BRIEF DESCRIPTION OF THE ACCOMPANYING DRAWINGS

One preferred embodiment of the present invention will now be described in greater detail hereinbelow, with reference to the accompanying Drawings, in which.

The accompanying Drawings show only those details and parts essential to an understanding of the present invention.

DESCRIPTION OF PREFERRED EMBODIMENT

Figure 1:
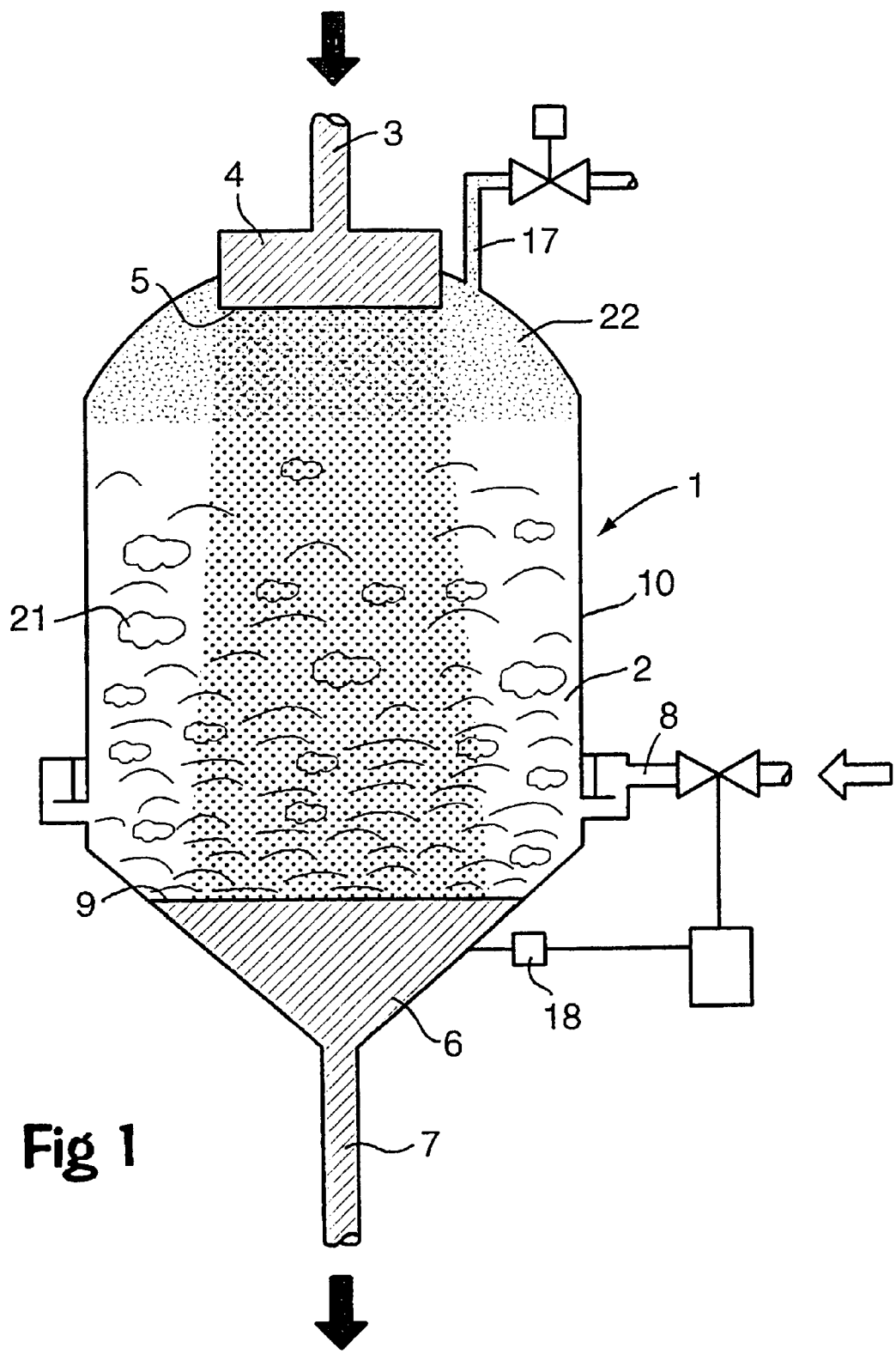
FIG. 1 is a side elevation, partly in section, of an infusor according to the present invention.

FIG. 1 shows, in side elevation, an infusor 1 according to the present invention. The infusor 1 consists substantially of a conventional autoclave 2. The autoclave 2 has, in its upper region, an inlet 3 for the product which is to be heat treated in the infusor 1. The product inlet 3 terminates with a distributor chamber 4. The distributor chamber 4 is centrally placed in the autoclave and has, on its lower wall 5, a large number of apertures or gaps. The apertures or gaps are intended to finely divide the incoming product so that the product, when it enters into the autoclave 2, forms a large number of small, fine droplets 20 which fall down through the autoclave 2.

In the lower, preferably lowermost, region of the autoclave 2, where the autoclave 2 forms a conical termination 6, there is disposed an outlet 7 for the product which has been heat treated in the infusor 1. The lower region of the conical termination 6 of the autoclave 2 functions as a holder cell where the product stays for a certain time before being pumped further for additional treatment.

An infusor 1 according to the present invention is further provided, in the lower region of the autoclave 2, with an inlet 8 for steam 21. The steam inlet 8 is placed well down in the autoclave 2, preferably above the conical termination 6 of the autoclave 2 and a slight distance from the liquid surface 9 which is formed by the heat-treated product, when the product stays in the autoclave 2 at a certain temperature and before leaving the autoclave 2.

Figure 2:
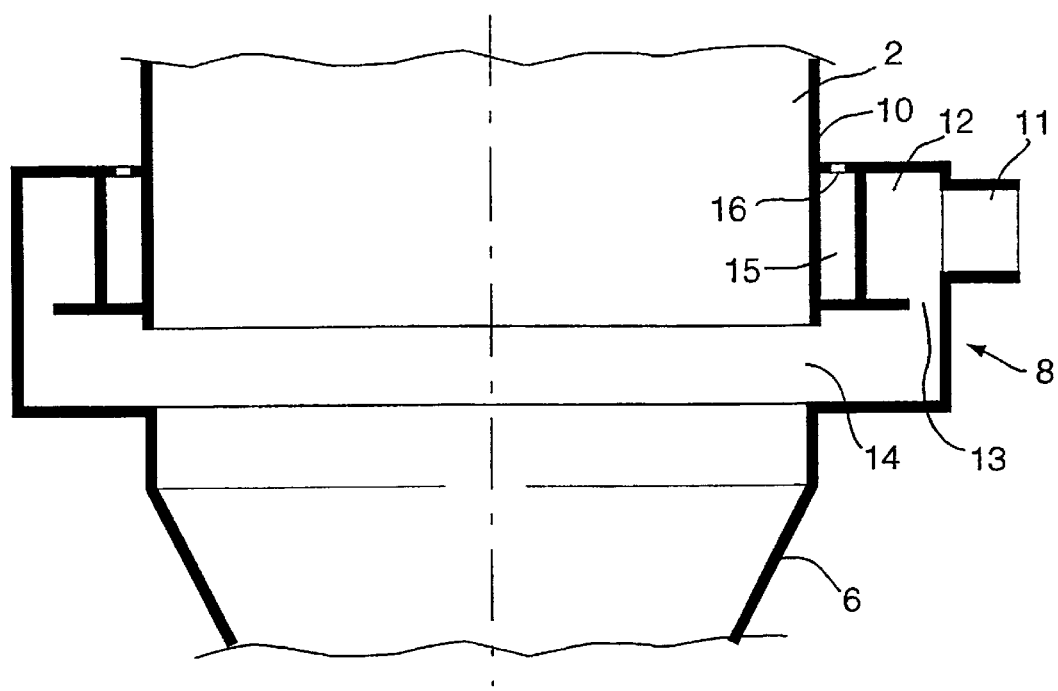
FIG. 2 is a side elevation, partly in section, of the steam inlet of the infusor.

The steam inlet 8 is shown in detail in FIG. 2. The steam inlet 8 is concentrically placed around the casting surface 10 of the autoclave 2. The steam inlet 8 is fed with steam 21 through an inlet pipe branch 11. The inlet branch 11 leads into a distributor chamber 12 extending concentrically. In the distributor chamber 12, the incoming steam 21 is distributed concentrically throughout the entire casing surface 10 of the autoclave 2 and thence passes further through a throttle 13 into the autoclave 2 through an aperture 14. In that the aperture 14 is concentric, there will be obtained a uniform distribution of the steam 21 in the autoclave 2. Alternatively, it is possible instead of the throttle 13, to connect the distributor chamber 12 to the aperture 14 by means of a number of concentrically distributed holes.

The distributor chamber 12 is insulated from the casing wall 10 of the autoclave 2 by an insulated space 15. The space 15 is insulated with air, in that a narrow gap 16 in the spacer 15 is made against the ambient air. The distributor chamber 12 is insulated from the autoclave 2 in order that the incoming, hot steam 21 does not unnecessarily and directly heat up the casing surface 10 of the autoclave 2. By reducing the temperature of the casing surface 10, this assists in reducing any possible burning of product on the inner wall of the casing surface 10.

The product entering the infusor 1 is pumped through a conduit to the inlet 3 in the upper region of the autoclave 2. The incoming product (which may, for example, consist of milk) is normally at a temperature of 75–82° C., in certain applications up to 120° C. From the inlet 3 and the distributor chamber 4, the product passes through a large number of apertures or gaps provided in the lower wall 5 of the distributor chamber 4. The product thereby forms a large number of small droplets 20 which fall freely down through the autoclave 2 until they reach the liquid 9. On their way down through the autoclave 2, the product droplets 20 meet pressurized steam 21 which is at a temperature of approx. 120–170° C., preferably 140–150° C.

By condensation of the steam 21, it rapidly heats the product droplets 20 to the desired temperature and when the droplets 20 reach the liquid surface 9, the product has attained the desired temperature. The distance between the distributor chamber 4 for the product and the liquid surface 9 should be so great that the product droplets 20 have time to be heated to the desired temperature. The ready-heated product will, for a certain period of time, stay in the conical termination 6 of the autoclave 2 before departing from the infusor 1 through the outlet 7.

As a result of the admission of steam 21 concentrically into the autoclave 2, there will be obtained a very uniform distribution of the steam 21 within the autoclave 2 and there is but a very slight risk that the inflowing steam 21 disrupts the product droplets 20. Given that the product droplets 20 may fall relatively straight down without disruption, the spattering of product on the hot inner walls of the autoclave 2 is reduced to a minimum, and thereby also the burning of product onto the walls of the autoclave 2.

During the heating process, uncondensable gases 22, such as oxygen, nitrogen and carbon dioxide, are released from the product. A certain quantity of uncondensable gases 22 will also come from the steam 21 employed in the process. In that the "coldest" area of the infusor 1 is located in the upper regions of the autoclave 2, the uncondensable gases 22 will be collected here and can be led out from the infusor through the outlet 17. The steam inlet 8 placed far down in the autoclave 2 thus contributes in creating the "cold" area uppermost in the autoclave which is required in order to be able to collect the uncondensable gases 22 with a slight admixture of steam 21 as possible.

The infusor 1 should also suitably be fitted with a temperature gauge 18 and other control equipment for running the process.

Figure 3:
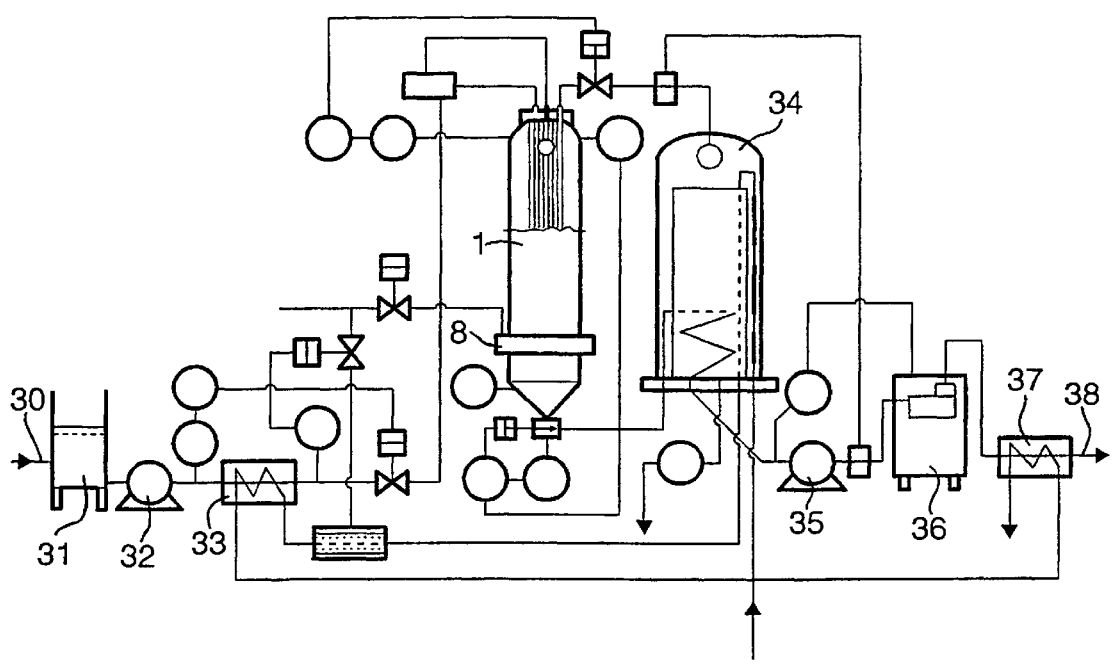
FIG. 3 is a flow diagram for a plant for heat treatment by means of infusion heat.

FIG. 3 shows how an infusor 1 is included as a part in a plant for the heat treatment of liquid foods by means of infusion heat. The incoming product 30 passes via a balance tank 31 and a pump 32. In a heat exchanger 33, for example a plate heat exchanger, the product is pre-heated to the desired temperature, normally of the order of 75–82° C., but temperatures of up to 120° C. may occur. The thus heated product is led in a conduit to the infusor 1 and is heat treated using the above-described method.

The ready-treated product is led from the infusor 1 to an expansion vessel 34 where the excess of water which the product has obtained as a result of the infusion heating is once again removed. Via a pump 35 and possibly a homogenizer 36, the product is led further to a cooler 37, for example a plate heat exchanger, where it is cooled to the desired temperature. The product then leaves the plant through a conduit 38 for further treatment or to final filling and packing in consumer packages.

As will have been apparent from the foregoing description, the present invention realises an apparatus in an infusor 1 which assists in enabling the admission of steam 21 at a low level in the autoclave 2 without the steam flow 21 disrupting the fall of the product droplets 20 down through the autoclave 2. Since the steam inlet 8 is placed in the lower region of the autoclave 2, there will also be created a "cold" area in the upper region of the autoclave 2, which makes it possible to evacuate the uncondensable gases 22 formed in the process, both simply and without unnecessary accompanying quantities of steam 21.

The present invention should not be considered as restricted to that described above and shown on the Drawings, many modifications being conceivable without departing from the scope of the appended Claims.

What is claimed is:

1. An apparatus in an infusor (1) for a liquid food product, the apparatus being of the type which includes an autoclave (2) with an inlet (3) for the product located in its upper region and an outlet (7) for the product located in its lower region, said inlet (3) being arranged to divide the product entering the autoclave (2) into small droplets (20), the infusor (1) further including an inlet (8) for steam (21) located in the lower region of the autoclave (2), characterized in that the steam inlet (8) substantially consists of a concentric aperture (14) in the casing surface (10) of the autoclave (2).

2. The apparatus as claimed in claim 1, characterized in that the steam inlet (8) is placed so far down on the cylindrical portion of the casing surface (10) as possible, but above the liquid surface (9) which is formed by the heated product.

3. The apparatus as claimed in claim 2, characterized in that the distance between the distributor chamber (4) of the product and the liquid surface (9) should be so great that the product droplets (20) have time to be heated to the desired temperature.

4. The apparatus as claimed in claim 1, characterized in that the steam inlet (8) consists of an insulated, concentric distributor chamber (12) which, by means of a throttle (13), is connected to the concentric aperture (14).

5. The apparatus as claimed in claim 1, characterized in that the steam inlet (8) consists of an insulated, concentric distributor chamber (12) which, by means of a number of concentrically placed holes, is connected to the concentric aperture (14).

6. The apparatus as claimed in claim 4, characterized in that the distributor chamber (12) is insulated in that a space (15) placed between the distributor chamber (12) and the casing surface (10) is in communication with ambient air via a gap (16).

* * * * *